United States Patent
Fuechsel et al.

(10) Patent No.: US 8,646,351 B2
(45) Date of Patent: Feb. 11, 2014

(54) HELICAL GEARING FOR A STEERING SYSTEM OF A MOTOR VEHICLE

(75) Inventors: Dennis Fuechsel, Schwaebisch Gmuend (DE); Ekkehard Kneer, Wendlingen (DE); Jens Hafermalz, Waeschenbeuren (DE); Arne Kuhlen, Ostenfelde (DE); Marco Grau, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/584,165

(22) Filed: Aug. 13, 2012

(65) Prior Publication Data

US 2013/0206497 A1    Aug. 15, 2013

Related U.S. Application Data

(63) Continuation of application No. PCT/EP2011/052567, filed on Feb. 22, 2011.

(30) Foreign Application Priority Data

Feb. 24, 2010   (DE) .......................... 10 2010 002 285

(51) Int. Cl.
- *F16H 1/16*   (2006.01)
- *F16H 1/20*   (2006.01)
- *F16H 35/06*  (2006.01)
- *F16H 35/08*  (2006.01)
- *F16H 35/00*  (2006.01)

(52) U.S. Cl.
USPC .......................... 74/425; 74/388 PS; 74/395

(58) Field of Classification Search
USPC ...... 74/395, 396, 416, 425, 388 PS; 384/215, 384/218, 517, 518, 519, 535, 536, 563, 581, 384/583

See application file for complete search history.

(56) References Cited

U.S. PATENT DOCUMENTS

| 3,009,748 | A  | * | 11/1961 | Pitner ........................... 384/581 |
| 6,708,796 | B2 | * | 3/2004  | Kinme et al. ................. 180/444 |
| 6,867,516 | B2 | * | 3/2005  | Frey et al. ....................... 310/51 |
| 7,048,088 | B2 |   | 5/2006  | Bernhard et al. |
| 7,686,515 | B2 |   | 3/2010  | Schust |
| 8,087,830 | B2 |   | 1/2012  | Hafermalz et al. |
| 8,327,971 | B2 | * | 12/2012 | Kim .............................. 180/444 |
| 2003/0136211 | A1 | * | 7/2003 | Ishii et al. ................. 74/388 PS |
| 2004/0222036 | A1 |  | 11/2004 | Bernhard et al. |

(Continued)

FOREIGN PATENT DOCUMENTS

| DE | 101 61 715 | 6/2003 |
| DE | 10 2005 035 020 | 2/2007 |

(Continued)

*Primary Examiner* — Justin Krause
(74) *Attorney, Agent, or Firm* — Jordan and Hamburg LLP

(57) ABSTRACT

An electric power-assisted steering system of a motor vehicle comprises a helical pinion which engages into a helical gear. A reloading device comprises a reloaded pressure piece which presses the helical pinion into the toothing of the helical gear. The requirements of assembly are reduced and the elastically urging of the helical pinion or the worm need not be adjusted during assembly since the necessary elastically urging is automatically adjusted such that friction in the gearing is minimized, improved efficiency is achieved and the spring force can be held as constant as possible throughout the service life and unwanted noise development in the gearing can be largely reduced.

10 Claims, 6 Drawing Sheets

(56) References Cited

U.S. PATENT DOCUMENTS

2008/0199114 A1 8/2008 Schust
2010/0260448 A1 10/2010 Hafermalz et al.
2010/0319475 A1 12/2010 Fuechsel

FOREIGN PATENT DOCUMENTS

| DE | 10 2007 055 814 | 6/2009 |
| DE | 10 2008 000 506 | 9/2009 |
| WO | WO-2009/109357 | 11/2009 |

* cited by examiner

HELICAL GEARING FOR A STEERING SYSTEM OF A MOTOR VEHICLE This is a Continuation of U.S. National Stage of PCT/EP2011/052567 Filed Feb. 22, 2011.

BACKGROUND OF THE INVENTION

The invention relates to helical gearing, more particularly worm gearing. The invention further relates to an electric power-assisted steering system comprising helical gearing.

Document DE 101 61 715 A1 makes known helical gearing of the type in question, which is embodied as worm gearing for use in an electric power-assisted steering system.

The worm gearing described in DE 101 61 715 A1 is disposed in a housing and comprises a worm and a worm gear. The worm is connected by way of a coupling to a drive shaft of an electric drive motor. In the design shown there, the worm is pivotable perpendicularly to the rotational axis and is supported in a rocker pivot or self-aligning bearing, thereby making it possible to hold the gear play constant during the entire service life of the gearing. To this end, the worm is acted upon radially by a preloading force and is permanently pressed against the toothing of the worm gear (or the helical gear). It has been shown that, in such designs, a change in rotational direction or a change in load in the gearing combined with existing gear play can cause the tooth faces of the helical pinion or the worm, and the tooth faces of the helical gear or the worm gear to impact one another, thereby generating impact noises. Nevertheless, the gear play should not be set too low during assembly since this can negatively influence the effectiveness and the wear of the gearing. In addition, the feedback properties of a power-assisted steering system can be impaired as a result, which, in turn, impairs the driver's steering sensation.

The maximum preload with which the worm can be pressed into the worm gear is limited since the worm gearing would jam otherwise.

The helical gears or worm gears used in electric steering systems are often made of plastic. Said plastic parts are subjected to creep deformation or wear throughout the service life. To ensure the elastically urging of the worm against the worm gear throughout the entire service life, a very large spring force, which diminishes over the course of the service life due to an increase in gear play, is applied in the new state in the case of the helical gearing or worm gearing known from the general prior art. In the new state, this results in increased friction and, therefore, efficiency disadvantages in the gearing.

Reference is made to DE 10 2008 000 506 A1 for the further prior art.

SUMMARY OF THE INVENTION

The objective of the present invention is to eliminate the aforementioned disadvantages of the prior art, more particularly to create a simple solution that can be achieved at low cost, in which friction in the gearing is minimized, improved efficiency can be achieved, the spring force can be held as constant as possible throughout the service life and unwanted noise development in the gearing can be largely reduced.

Disclosed is an advantageous electric power-assisted steering system for motor vehicles.

The solution according to the invention results in minimization of friction in the gearing and increases efficiency since continuous elastically urging with an approximately consistent spring force during the entire service life is attained. It is not necessary for a very large spring force to be applied in the new state. In addition, by way of the continuous elastically urging with an approximately consistent spring force, clattering noises or disturbing noises are prevented or largely reduced throughout the entire service life. Due to the simple design of the solution according to the invention, the requirements on assembly are reduced. It is particularly advantageous that the elastically urging of the helical pinion or the worm need not be adjusted during assembly since the necessary elastically urging is automatically adjusted by way of the solution according to the invention.

The solution according to the invention increases the robustness of the helical gearing and, therefore, of the entire power-assisted steering system. Due to the automatic compensation for changes in axial spacing resulting from the invention, only minimal spring forces are required.

The solution according to the invention makes it possible to compensate for tolerance, wear and temperature in the tooth engagement between the helical pinion and the helical gear throughout the entire service life.

By way of the solution according to the invention, the function "attaining the basic play," in order to compensate for temperature expansions and, therefore, concentricity tolerances in particular, and the function "achieving the readjustment," in order to make readjustment possible, for example, due to creep deformation or wear in the toothing components in particular, are separated from one another in a particularly advantageous manner.

The helical gearing according to the invention for a steering system of a motor vehicle, preferably for an electric steering system, more particularly an electric power-assisted steering system of a motor vehicle, comprises a helical pinion, which engages into a helical gear. A preloading device is provided that comprises a preloaded pressure piece, which presses the helical pinion into the toothing of the helical gear.

The preloading device comprises a housing part, which has a section having an internal thread, in which a readjusting element is screwed. The screwed-in readjusting element is loaded with a force in the direction of the pressure piece by way of a readjusting spring.

Furthermore, according to the invention, the pressure piece is disposed between the helical pinion and the readjusting element, and is guided in an axially displaceable manner by way of a guide contour in the housing part. The guide contour in the housing part is preferably designed such that the pressure piece is non-rotatably guided in the housing. It is initially essential to the invention that the guide contour specifies a defined trajectory of the pressure piece in the housing part, wherein the predefined trajectory is preferably an exclusively axial motion of the pressure piece in the housing part.

It is advantageous when the guide contour in the housing part is formed by at least two axially extending grooves, in which guide elements of the pressure piece are disposed in an axially displaceable manner. It is particularly easy to form two axially extending grooves.

Corresponding guide elements, preferably on the outer side of the pressure piece, are also easy to produce. It has been shown that two grooves are sufficient to achieve particularly advantageous, stable axial guidance of the pressure piece. The pressure piece is therefore guided axially and non-rotatably in the housing part. Basically, the guide contour could also be attained by way of only one axially extending groove or also by way of more than two grooves.

It is also possible, of course, to design the guide contour in the housing part either as projections or as grooves. Both solutions are feasible here. The pressure piece must then comprise corresponding counter-elements.

It is advantageous when the housing part that comprises the guide contour for the pressure piece is a housing part that is identical to the housing part in which the internal thread for the readjusting element is formed. Basically, however, there can be two separate housing parts, which are then preferably connected to one another.

According to the invention, a preloading means, which is disposed between the readjusting element and the pressure piece and presses the pressure piece against the helical pinion, is further provided. The pressure piece can be movable with respect to the readjusting element in an axially preloaded manner.

The task of the preloading device is to apply an exactly defined force onto the helical pinion in the direction of the helical gear in all operating states. The preloading device preferably applies a radially acting force onto the helical pinion. The application of a force that is defined as exactly as possible is advantageous in order to attain the best possible efficiency for the gearing and to minimize the loading of the toothing of the gearing. The preloading device should preferably compensate for various influencing factors that exist due to production or that occur during operation of the helical gearing. To this end, a certain basic play should be attained by way of the preloading device in order to be able to compensate for temperature expansion and concentricity tolerances of the components of the helical gearing. Within said basic play, the pressure force of the preloading device should not fall below or exceed an exactly defined lower limit or a defined upper limit, respectively.

According to the invention, the basic play is attained by way of the pressure piece, which is preloaded and axially movable with respect to the readjusting element.

Furthermore, the preloading device should be able to automatically compensate for the wear of the helical gearing, especially the creep deformation of the toothed ring, more particularly a plastic toothed ring of the helical gear, and, if necessary, further component tolerances.

According to the invention, the pressure piece comprises guide components, which engage in an axially movable manner into axially extending guide sections of a guide contour of the readjusting element, and wherein the guide components exit the axially extending guide sections in the direction of the helical pinion when the distance between the pressure piece and the readjusting element exceeds a defined value.

The guide components of the pressure piece may be located in the axially extending guide sections when the pressure piece is spring-loaded up to an end stop or makes a compensation motion that is typical for compensating for temperature fluctuations and concentricity flaws. The guide contour comprising the axially extending guide sections makes it possible for the pressure piece to move axially relative to the readjusting element. The guide contour comprising the axially extending guide sections is responsible for the basic play and permits a certain axial motion of the pressure piece along the length of the axial guide sections. If a certain travel has been completed or if the distance between the pressure piece and the readjusting element exceeds a defined value, the pressure piece and the guide components thereof exit the axially extending guide sections of the readjusting element. As a result, the rotational motion of the readjusting element is released; that is, the readjusting element is now able to rotate in the internal thread of the housing part. The readjusting element is rotated by way of the force of the readjusting spring and moves in the direction of the helical pinion or the helical gear. The rotation of the readjusting element in the internal thread of the housing part, that is, the screw motion of the readjusting element, can continue until the guide components of the pressure piece snap into subsequent guide sections of the readjusting element. As a result, the rotational motion is stopped and the state of basic play prevails once more. The travel of a readjustment cycle can be regulated by way of the spacing of the axially extending guide sections distributed around the circumference and by way of the pitch of the internal thread of the housing part.

Preferably, the readjusting element has a guide contour having a plurality of axially extending guide sections, which are preferably distributed around the entire circumference with constant spacing.

The pressure piece preferably comprises two or more guide elements, each of which engages into an axially extending guide section.

Basically, it is also possible to provide the pressure piece with only one guide component. In order to increase stability, however, it has proven effective to provide at least two guide components. Preferably, the guide components can be formed at opposing points of the internal wall of the pressure piece.

It is particularly advantageous when the axially extending guide sections of the guide contour are distributed with constant spacing in an annularly circumferential manner around the circumference of the readjusting element, and the pressure piece comprises at least two guide components, which are disposed in two guide sections in an axially movable manner.

The axially extending guide sections are preferably designed as guide grooves. Preferably, the axially extending guide sections, preferably in an embodiment as guide grooves, can be separated from one another or formed by guide ribs lying there between.

The axially extending guide sections can be designed either as raised areas or, preferably, as grooves in the readjusting element. Provided that the axially extending guide sections are formed as grooves, it is advantageous to design the pressure piece guide components, which engage into the grooves, as protruding guide projections. They can be preferably formed on the inner wall of the pressure piece, which is preferably shaped as a nozzle, in the region of the end of the pressure piece facing the readjusting element.

Automatic readjustment, in that the readjusting spring presses the readjusting element axially in the direction of the pressure piece, is attained by way of the preloading device according to the invention if wear or creep deformation of the toothing occurs. This force is converted into rotational motion by the internal thread of the housing part or the corresponding external thread of the readjusting element. The readjusting element can move in the internal thread of the housing part only on a helical trajectory, or can perform rotational motion. Since the readjusting element is connected to the pressure piece by way of a guide contour and the pressure piece is supported in the housing part by way of a further guide contour in such a way that it can only be displaced axially, the readjusting element is initially unable to perform rotational motion.

The rotational motion that could be carried out by the force of the readjusting spring is hindered in that the pressure piece comprises guide components, preferably guide projections, which are supported in the guide contour of the readjusting element. However, the rotational motion of the readjusting element is blocked only for as long as the pressure piece, including the guide components thereof, is located in the axially extending guide sections of the guide contour of the readjusting element (basic play region). The guide components are located in said region when the pressure piece is spring-loaded up to an end stop or when the pressure piece performs only typical compensation motions that serve to compensate for temperature fluctuations and to compensate for concentricity flaws.

If the play between the helical pinion and the helical gear increases due to wear, for example, the pressure piece is pressed by the preloading means further in the direction of the helical gear. If a certain travel has been completed, the pressure piece, including the guide components thereof, exits the axially extending guide sections. Rotational motion can now take place. As a result, the readjusting element can rotate due to the force of the readjusting spring and moves along a helical trajectory in the direction of the helical gear. By way of said motion, the guide components of the pressure piece can be pressed into an axial guide section once more, thereby stopping the rotational motion of the readjusting element. Continuous readjustment is therefore ensured as soon as the play between the helical pinion and the helical gear leaves the basic play region. The guide section into which the guide element is pressed once more is usually a guide section that follows, in the direction of rotation, the guide section that the guide element previously exited.

By way of the embodiment according to the invention, it is also possible to prevent the readjusting element from moving in a direction away from the pressure piece.

It is advantageous when the preloading means, which is disposed between the readjusting element and the pressure piece, is designed as a compression spring, the ends of which are braced against opposing end faces of the pressure piece and the readjusting element. As a result, a housing for the compression spring can be created in a particularly simple manner. Furthermore, a compression spring has proven particularly suitable for generating a preload that is suitable for maintaining pressure piece play that is as constant as possible.

It is advantageous when the pressure piece is designed in the shape of a nozzle, thereby making it possible to dispose the preloading means or, preferably, the compression spring in the interior of the nozzle.

It is also advantageous when the readjusting element and the pressure piece form an end stop for limiting the travel of the pressure piece. The end stop is used to limit a return of the pressure piece in a direction facing away from the helical pinion. In a structural embodiment of the invention, it can be provided that the end stop comprises an elastic damping element. The elastic damping element can be formed at a suitable point of the pressure piece and/or at a suitable point of the readjusting element.

Preferably, the end stop is formed so that the pressure piece moves toward the readjusting element by way of the compression-spring side end face thereof, that is, the end face facing away from the helical pinion. The travel against the helical gear is therefore limited in a simple manner.

It is advantageous when the internal thread of the housing part is not self-inhibiting. It is thereby made possible in a simple manner so that rotational motion of the readjusting component in the housing part takes place automatically when the guide components of the pressure piece have exited the axially extending guide sections, thereby making it possible to compensate for changes in axial spacing in the gearing.

To make simple readjustment possible, it is advantageous when one end of the helical pinion is supported in a floating bearing. A suitable embodiment of a floating bearing becomes apparent from DE 10 2005 035 020 A1 and DE 10 2007 055 814 A1, for example. The floating bearing is preferably fixed radially in a bearing bush or a pivot bushing in such a way that the helical pinion can pivot in the direction of the helical gear.

To permit the bearing of the helical pinion to be moved radially accordingly by the preloading device, an embodiment of a groove, which is easily imagined and is therefore not depicted in greater detail, or a slot is feasible. The use of a rocker pivot or a self-aligning bearing is also possible.

A second bearing, which preferably supports the helical pinion at the other end, is preferably provided to support the helical pinion. The use of a fixed bearing is advantageous, which preferably permits a small pivoting angle, thereby ensuring that the pivot motion of the helical pinion induced by the preloading device is not hindered. The helical pinion is preferably supported on the fixed-bearing side by a roller bearing.

A roller bearing is preferably also provided on the floating-bearing side. It can be provided that the outer ring of the roller bearing is radially fixed in an above-described bearing bush or a pivot bushing.

It is advantageous when the preloading device presses the helical pinion into the toothing of the helical gear by way of the floating bearing.

Preferably, the pressure piece, the pressure piece spring (preloading means), the readjusting element and the readjusting spring are disposed axially one behind the other in said order starting from the helical pinion. The spring elements exert an axial force in the direction of the helical pinion, and so the helical pinion is loaded radially by a force acting in the direction of the helical gear. The pressure piece spring (preloading means) is preferably enclosed on the outer side, at least partially, by the pressure piece, which is preferably designed in the shape of a nozzle in this region.

It is advantageous when the helical gearing is designed as worm gearing, wherein the helical gear is designed as a worm gear and the helical pinion is designed as a worm, and wherein the worm is engaged with the worm gear.

The pressure piece is preferably designed as a clamping bolt. The readjusting spring is preferably a compression spring. The housing part accommodating the readjusting part is preferably designed as a nozzle comprising a circumferential wall and a base part.

It is furthermore advantageous when an electric power-assisted steering system for motor vehicles is designed with helical gearing or worm gearing that has one or a plurality of features of the above-described helical gearing or worm gearing.

Advantageous embodiments will become apparent from the further dependent claims. An exemplary embodiment of the invention is depicted with respect to the principle thereof in the following with reference to the drawings.

DESCRIPTION OF THE PREFERRED EMBODIMENTS

The basic design of helical gearing or worm gearing, more particularly also for the use thereof in an electric power-assisted steering system for motor vehicles, has long been known from the general prior art, with respect to which reference is made to DE 101 61 715 A1 and DE 10 2008 000 506 A1, for example, and so only the features that are essential to the invention will be described in greater detail in the following. With respect to an advantageous embodiment of a floating bearing, reference is made, for example, to the solutions described in DE 10 2007 055 814 A1 and DE 10 2005 035 020 A1.

Within the scope of the invention and the exemplary embodiment presented in the following, it is intended that the disclosure of the invention with reference to helical gearing should be considered to also disclose a worm gearing by way of analogy. The helical pinion corresponds to the worm and the helical gear corresponds to the worm gear.

Figure 1:
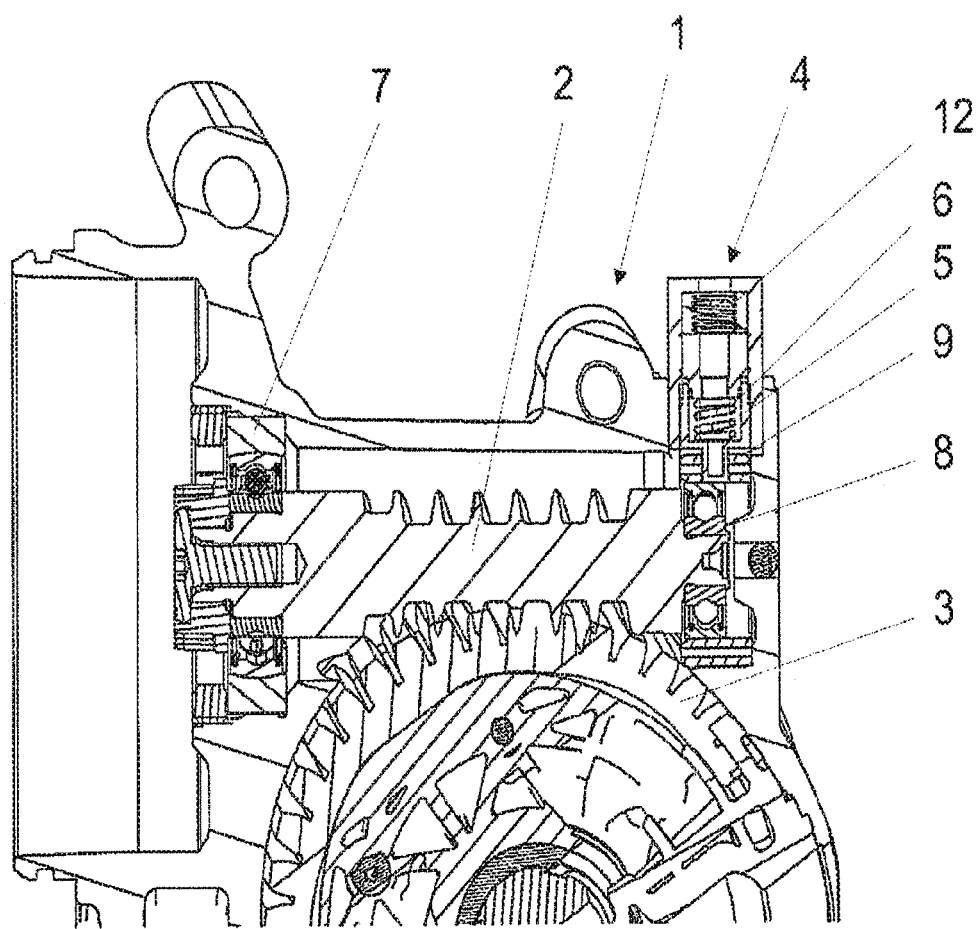
FIG. 1 shows a principle of a design of helical gearing comprising a preloading device according to the invention.

FIG. 1 shows helical gearing 1 of a steering system, which is not depicted in greater detail, more particularly of an electric power-assisted steering system of a motor vehicle. The helical gearing 1 comprises a helical pinion 2, which engages into a helical gear 3. The helical gear 3 is made of plastic in the exemplary embodiment. A preloading device 4, which is equipped with a preloaded pressure piece 5, is provided. The pressure piece is designed as a clamping bolt 5 in the exemplary embodiment. The clamping bolt 5 is preloaded by a preloading means, specifically a compression spring 6 in the exemplary embodiment, and presses the helical pinion 2 into toothing of the helical gear 3.

The helical pinion 2 is supported on the fixed-bearing side by a roller bearing 7, which permits a small pivoting angle. The helical pinion 2 can be connected at this end by way of a coupling to a drive shaft of an electric drive motor. The other end of the helical pinion 2 is supported in a floating bearing 8. In the exemplary embodiment, the floating bearing 8 is also embodied as a roller bearing. The outer ring of the floating bearing 8 is radially fixed in a bearing bush 9. The bearing bush 9 is preferably pivotable in the direction of the helical gear 3.

The helical pinion 2 is pressed by way of the floating bearing 8 by the preloading device 4 with a certain force into the toothing of the helical gear 3.

As shown in FIGS. 2 to 6, the preloading device 4 comprises a housing part 10, a readjusting element 11, a readjusting spring 12 and the previously described pressure piece 5 and the compression spring 6 for the basic play. The housing part 10 is designed as a nozzle in the exemplary embodiment. The readjusting spring 12 is designed as a compression spring in the exemplary embodiment.

The pressure piece 5 comprises a nozzle-shaped end piece, which faces the readjusting element 11 and accommodates the compression spring 6.

The pressure piece 5 is connected to the housing part 10 in an axially displaceable manner by way of a guide contour 13.

An end face of the pressure piece 5 facing away from the helical pinion 2 presses against a compression spring 6, which, in turn, rests against the readjusting element 11 or an end face of the readjusting element 11. The pressure piece 5 is also connected to the readjusting element 11 by way of a further guide contour 14. Said guide contour 14 has a plurality of axially extending guide sections 15, which permit axial motion of the pressure piece 5 relative to the readjusting element 11.

The axially extending guide sections 15 are distributed with constant spacing around the entire circumference of the readjusting element 11. The axially extending guide sections 15 are designed as grooves, between which guide ribs 16 extend in the axial direction.

The axially extending guide sections 15 of the guide contour 14 are responsible for the basic play, by way of which a certain axial motion of the pressure piece 5 relative to the readjusting element 11 is ensured. If only small forces take effect, the compression spring 6 is utilized and compensates for concentricity tolerances and thermal expansions, for example. If greater forces take effect, for example, increased repelling forces in the toothing, the compression spring 6 is compressed up to end stop 17. In the exemplary embodiment, the end stop 17 is attained so that the pressure piece 5 moves toward the readjusting device 11 by way of the compression-spring side end face thereof. To this end, the readjusting element 11 in the exemplary embodiment preferably comprises a step, against which the end face of the pressure piece 5 can impact. As a result, travel limitation of the pressure piece 5 or the compression spring 6 is achieved, and so the travel toward the helical gear 3 is limited.

Figure 5:
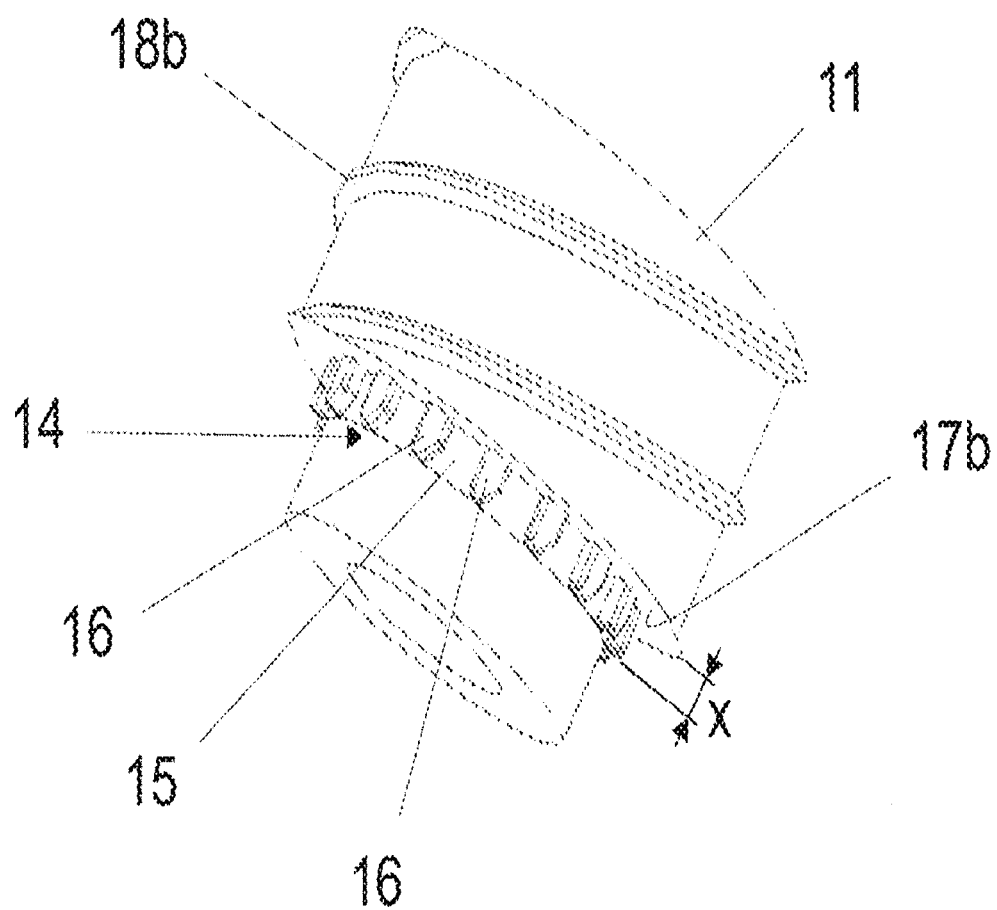
FIG. 5 shows a perspective depiction of a readjusting element of the preloading device according to the invention.
Figure 6:
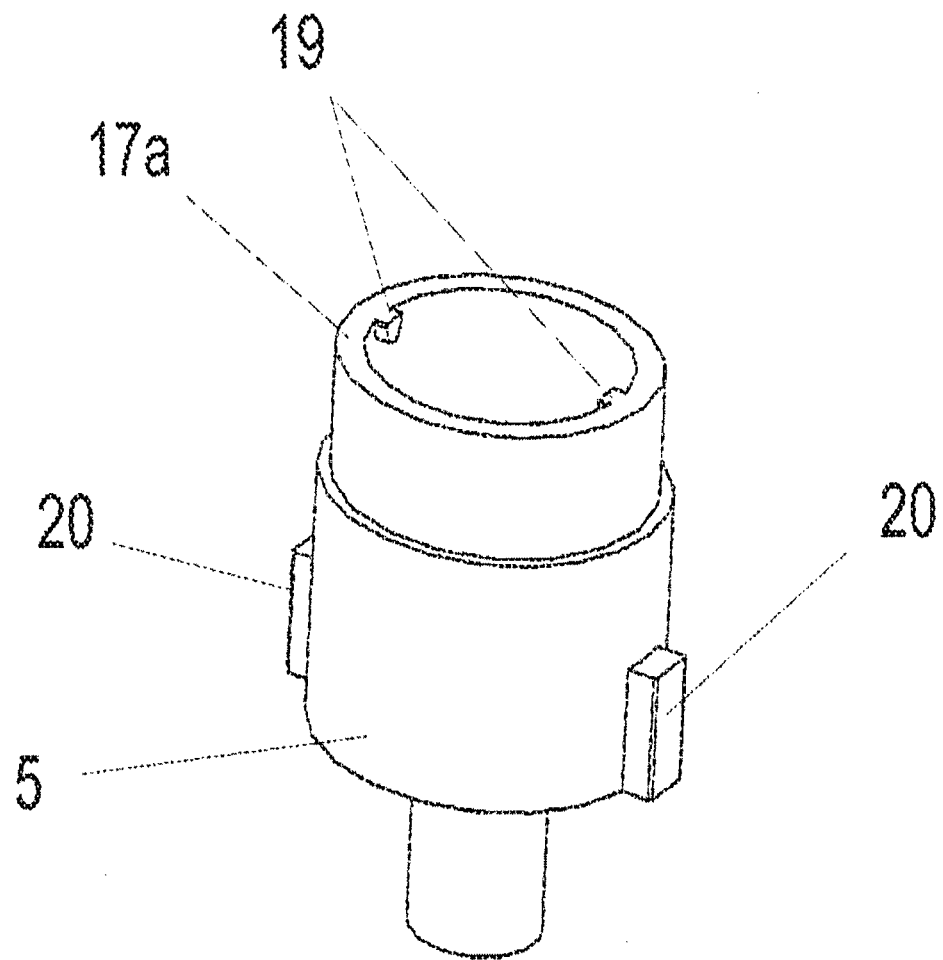
FIG. 6 shows a perspective depiction of a pressure piece of the preloading device according to the invention.

In FIGS. 5 and 6 the end-stop surfaces of the pressure piece 5 or the readjusting element 11 forming the end stop 17 are labeled with reference characters 17a and/or 17b.

Figure 2:
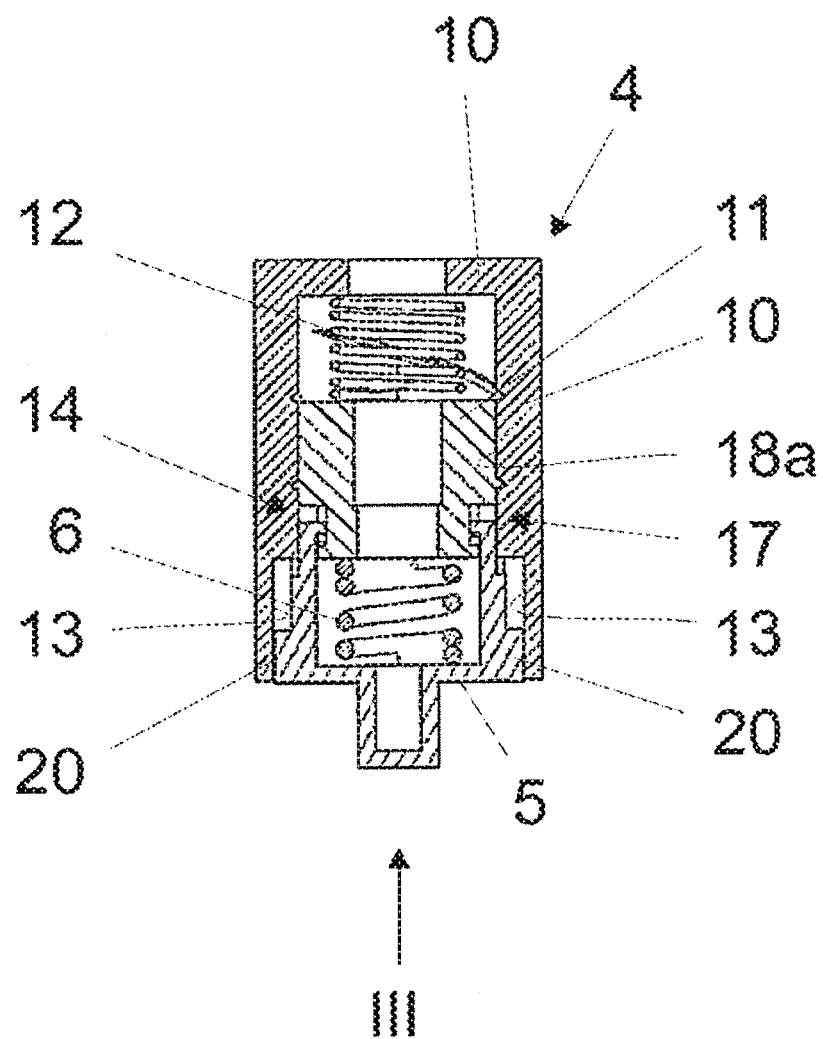
FIG. 2 shows a longitudinal view through a preloading device according to the invention, according to the line II-II of FIG. 3.
Figure 4:
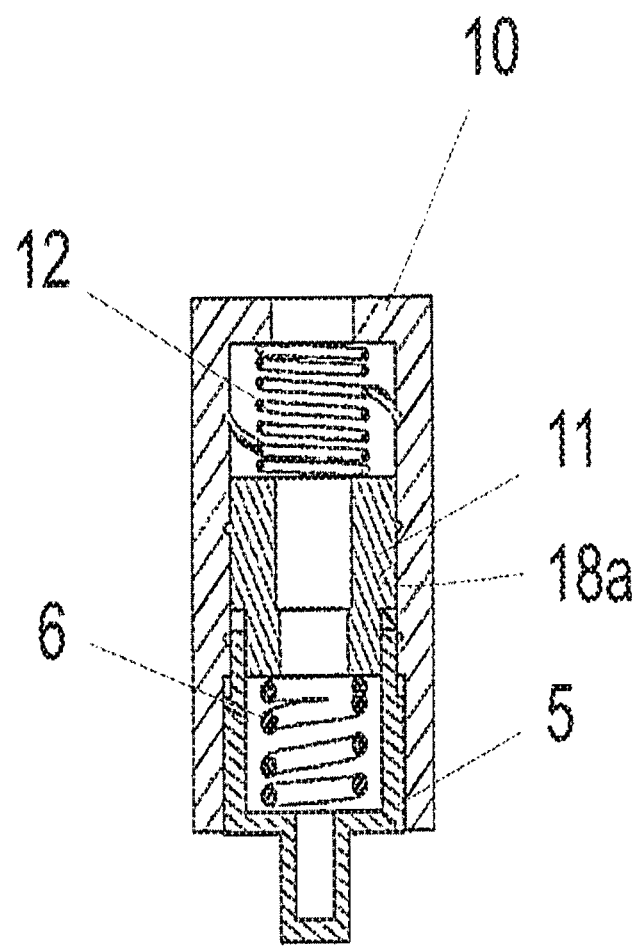
FIG. 4 shows a further longitudinal view of a preloading device according to the invention, which is offset by 90° compared to the longitudinal view in FIG. 2.

As shown furthermore in FIGS. 2, 4 and 5, the housing part 10 comprises a non-self-inhibiting internal thread 18a, by way of which the readjusting element 11 is received. To this end, the readjusting element 11 comprises a corresponding external thread 18b (see FIG. 5). The readjusting spring 12 is installed or accommodated between the readjusting element 11 and the housing part 10, preferably a base of the housing part 10. Due to the preload thereof, the readjusting spring 12 applies a force onto the readjusting element 11. Said force is converted into rotational motion by way of the internal thread 18a. Since the readjusting element 11 is guided in the pressure piece 5 and the pressure piece 5 only permits axial motion (axial guide contour 13 in the housing part 10), the motion is dependent on the guide contour 14 in the readjusting element 11 (see FIG. 5). Provided the pressure piece 5 moves in the region of the guide contour 14 or the axially extending guide sections 15, that is, the spacing between the pressure piece 5 and the readjusting element 11 does not exceed a defined value (basic play region), the readjusting element 11 is blocked against rotating. If the play increases (due to wear, for example), the pressure piece 5 is pressed by the compression spring 6 further in the direction of the helical gear 3. If a certain travel has been completed or as soon as a defined distance between the pressure piece 5 and the readjusting device 11 has been exceeded, the pressure piece 5, including the guide components 19 thereof, exits the axially extending guide sections 15. By exiting the axial guide sections 15 of the guide contour, rotational motion is made possible. As a result, the readjusting element 11 is rotated by the force of the readjusting spring 12 and moves in the direction of the helical gear 3. By way of said motion, the guide components 19 of the pressure piece 5 are pressed back into the basic play region, that is, a subsequent guide section 15 of the guide contour 14, thereby stopping the rotational motion. Continuous readjustment is therefore ensured as soon as the play leaves the basic play region.

In the exemplary embodiment, the guide ribs 16 are formed in an annularly circumferential manner on the outer circumference of the readjusting element 11, and so an axially extending guide section 15 is formed between every two guide ribs 16. In the exemplary embodiment, the guide components 19 are formed on the inner circumference of the pressure piece 5 as guide projections and protrude inwardly. The guide projections 19 are formed on the end of the pressure piece 5 that faces the readjusting element 11.

The guide contour 14, including the axially extending guide sections 15 thereof, is labeled with "X" with respect to the length thereof in the exemplary embodiment in FIG. 5. A person skilled in the art understands what values for "X" are suitable for ensuring that readjustment occurs only when the gear play becomes too great. Said values can be adjusted individually to the gearing or the wear to be expected or to temperature fluctuations and concentricity flaws.

Figure 3:
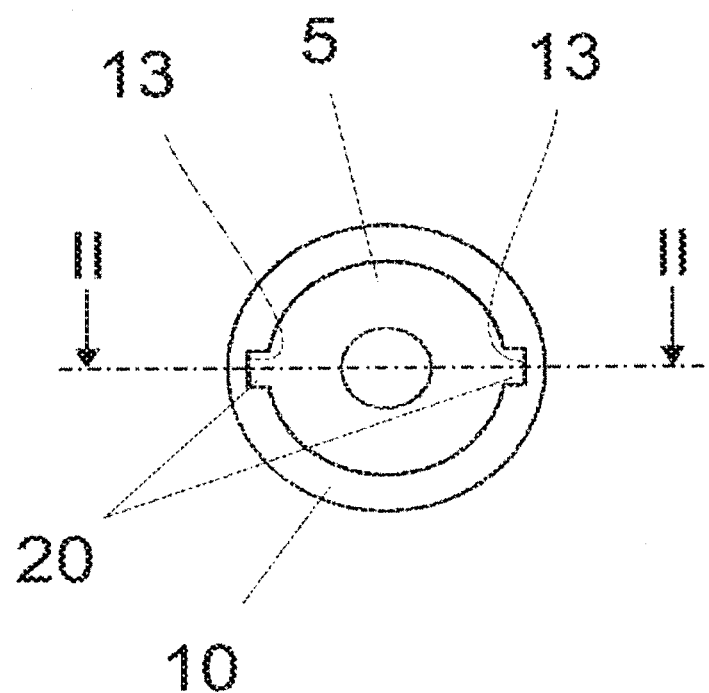
FIG. 3 shows a top view of a preloading device according to the invention, from the arrow direction III of FIG. 2.

The guide contour 13 in the housing part 10, which defines the axial motion of the pressure piece 5 in the housing part 10, is represented by two guide tracks, which, in turn, are embodied as guide grooves in the housing part 10 (see FIGS. 2 and 3). The pressure piece 5 comprises guide elements 20, which engage into the guide contour 13 or the guide grooves thereof and are designed correspondingly, preferably as bar-shaped protrusions or projections or groove/spring connecting elements.

The invention claimed is:

1. Helical gearing for a steering system of a motor vehicle comprising a helical pinion which engages into a helical gear, a preloading device that has a preloaded pressure piece, which presses the helical pinion into toothing of the helical gear wherein:
    a) the preloading device comprises a housing part which has a section having an internal thread in which a readjusting element is screwed, wherein the readjusting element is loaded with a force in the direction of the pressure piece by way of a readjusting spring,
    b) the pressure piece is guided by way of a guide contour in the housing part so that it is axially displaceable between the helical pinion and the readjusting element,
    c) a preloading means which is disposed between the readjusting element and the pressure piece is provided and presses the pressure piece against the helical pinion, and
    d) the pressure piece comprises guide components which engage in an axially movable manner into axially extending guide sections of a guide contour of the readjusting element, wherein the guide components exit the axially extending guide sections in the direction of the helical pinion when the distance between the pressure piece and the readjusting element exceeds a defined value.

2. The helical gearing according to claim 1, wherein one end of the helical pinion is supported in a floating bearing.

3. The helical gearing according to claim 2, wherein the preloading device presses the helical pinion by way of the floating bearing into the toothing of the helical gear.

4. The helical gearing according to claim 1, wherein the guide contour in the housing part is formed by at least two axially extending grooves, in which guide elements of the pressure piece are disposed in an axially displaceble manner.

5. The helical gearing according to claim 1, wherein the preloading means is designed as a compression spring, the ends of which are braced against opposing end faces of the pressure piece and the readjusting element.

6. The helical gearing according to claim 1, wherein the readjusting element and the pressure piece form an end stop for limiting the travel of the pressure piece.

7. The helical gearing according to claim 1, wherein the internal thread of the housing part is not self-inhibiting.

8. The helical gearing according to claim 1, wherein the axially extending guide sections of the guide contour are distributed with constant spacing in an annularly circumferential manner around the circumference of the readjusting element, and the pressure piece comprises at least two guide components which are disposed in two guide sections in an axially movable manner.

9. The helical gearing according to claim 1, wherein the helical gearing is designed as worm gearing, wherein the helical gear is designed as a worm gear and the helical pinion is designed as a worm, and wherein the worm is engaged with the worm gear.

10. An electric power-assisted steering system for motor vehicles comprising the helical gearing of claim 1.

\* \* \* \* \*